United States Patent [19]

Baratoff

[11] 4,371,141

[45] Feb. 1, 1983

[54] VIBRATION ISOLATION SYSTEM WITH ADJUSTABLE CONSTANT FORCE, ALL-DIRECTIONAL, ATTENUATING SEISMIC RESTRAINT

[75] Inventor: Paul Baratoff, Jackson Heights, N.Y.

[73] Assignee: Korfund Dynamics Corporation, Westbury, N.Y.

[21] Appl. No.: 190,241

[22] Filed: Sep. 24, 1980

[51] Int. Cl.³ ........................................... F16M 13/00
[52] U.S. Cl. ..................................... 248/569; 248/559
[58] Field of Search ............... 248/559, 562, 563, 565, 248/569; 52/167; 188/380

[56] References Cited

U.S. PATENT DOCUMENTS

| | | | |
|---|---|---|---|
| 1,763,682 | 6/1930 | Wallace | 248/570 |
| 2,173,342 | 9/1939 | Rosenzweig | 248/20 |
| 2,281,955 | 5/1942 | Rosenzweig | 248/20 |
| 2,359,915 | 10/1944 | Hussman | 267/1 |
| 2,586,307 | 2/1952 | Crede | 346/7 |
| 2,631,841 | 3/1953 | Tillou et al. | 267/1 |
| 2,660,386 | 11/1953 | Munro | 248/21 |
| 2,687,270 | 8/1954 | Robinson | 248/358 |
| 3,145,012 | 8/1964 | Kfoury | 188/330 |
| 3,459,395 | 8/1969 | Scotto | 248/562 X |
| 3,912,248 | 10/1975 | Pickford et al. | 248/562 X |
| 4,040,590 | 8/1977 | Baratoff | 248/358 AA |

FOREIGN PATENT DOCUMENTS 454773 3/1949 Canada .
279410 3/1952 Switzerland ...................... 248/562

OTHER PUBLICATIONS

Accumulated Slip of a Friction-Controlled Mass Excited by Earthquake Motions, Crandall et al., Transactions of the ASME, Dec. 1974.

Primary Examiner—William H. Schultz
Attorney, Agent, or Firm—Brumbaugh, Graves, Donohue & Raymond

[57] ABSTRACT

A vibration isolation system includes a seismic restraint assembly that attenuates forces above a chosen magnitude transmitted to a unit from a support during a seismic event. Vertical friction elements on a vertical frame engage and support a vertical damper element. Horizontal friction elements on a horizontal frame engage and retain a horizontal damper element. One frame is connected to the unit, the other to the support. The vertical and horizontal damper elements interconnect, but lost motion spacing between these elements ordinarily prevents low level vibrations being communicated therethrough. Each of the vertical and horizontal friction elements is spring biased into a predetermined frictional engagement with its associated damper element. The force of the engagement is adjustable to adjust the level at which higher than ordinary forces that are being transmitted through the assembly will begin to be attenuated by slippage of the frictionally engaged elements.

11 Claims, 14 Drawing Figures

VIBRATION ISOLATION SYSTEM WITH ADJUSTABLE CONSTANT FORCE, ALL-DIRECTIONAL, ATTENUATING SEISMIC RESTRAINT

FIELD OF THE INVENTION

The present invention relates to vibration isolation systems and, in particular, to a seismic restraint assembly for limiting the forces transmitted to equipment supported on isolators to amounts substantially less than the maximum input forces that might be generated by a seismic event.

BACKGROUND OF THE INVENTION

It is common practice to mount various types of equipment, such as engines, machine tools, fans, blowers, pumps, compressors, turbines, indeed all manner of vibration-producing equipment, on vibration isolators for minimizing the transmission of vibration from the equipment to a supporting structure. On occasion, vibration isolation systems are used to minimize the transmission of vibration from the supporting structure to the equipment (a use often referred to as "negative isolation"); such is the case with delicate scientific equipment that is sensitive to ambient vibration generated by equipment in the building and vehicular traffic and other sources around the building.

In various installations of vibration isolated equipment, it is desirable to include restraint devices to prevent the equipment from moving relatively large distances in response to seismic events (earthquakes); if the natural frequency of the isolation system should be matched by an earthquake, possibly damaging high amplitude, transient vibrations of the equipment may occur. Moreover, the input force of the seismic event may be magnified substantially. Energy-absorbing stops may be adequate in many cases to reduce the excursion, but the stops always magnify the input forces.

The inventor of the present invention has previously disclosed an improved seismic restraint device in U.S. Pat. No. 4,040,590 (assigned to the assignee of the present invention), and that device is now in commercial use. That device employs friction elements to limit the maximum force transmitted to the isolated equipment to the input force of the earthquake. The device permits unrestrained, normal vibration of the equipment (normal operation of the isolators), while preventing magnification of seismic input forces. The friction elements limit the force transmitted to the equipment to an input force of a selected amount, and if the input force exceeds the restraining friction forces, the friction elements slip, and after a small movement, the equipment is stopped from further movement by resilient energy-absorbing stops, which absorb the remaining input energy.

SUMMARY OF THE INVENTION

There is provided, in accordance with the present invention, a seismic restraint assembly that enables the force (acceleration) imposed on equipment supported on isolators to be kept substantially below the maximum input force of an earthquake. This invention uses friction elements that are resiliently loaded to generate friction forces substantially less than the maximum input forces and provides for relatively large total displacement of the equipment over the duration of the earthquake. After each cycle of an input force that causes movement of the equipment on the support, the equipment has been displaced by a small amount (i.e., does not return to the initial position at the start of that cycle). Therefore, the equipment tends to "walk" on the support in the course of the earthquake, and hence it is important to allow for such total displacement. Based on work done at MIT, it is possible to predict approximately the maximum total displacement of the isolated unit with respect to the support for certain typical earthquakes of various intensities. The MIT work is reported in a technical article entitled "Accumulated Slip of a Friction-Controlled Mass Excited by Earthquake Motions" by S. H. Crandall, S. S. Lee and J. H. Williams, Jr., published in *Transactions of the ASME, Journal of Applied Mechanics*, Paper No. 74-WA/APM-16 (1974).

In particular, the invention relates to a seismic restraint assembly for use in a vibration isolation system in which equipment is mounted on a support by means of a number of vibration isolators. In many instances, the vibration-isolated equipment is mounted on an inertia block or base, which in turn is mounted on the isolators, so the term "unit" is used herein to refer to the equipment and any inertia block or base forming part of the isolated and supported mass. The support may, of course, be a foundation, piers, beams, and all manner of structures by which the unit is supported.

The seismic restraint assembly, according to the present invention, comprises a vertical frame that is attached to either the supported unit or the support and having vertical guide bearings which receive a vertical damper element for vertical movement, and preferably two friction elements acting in opposition, relative to the frame. At least one friction element, and preferably two friction elements acting in opposition, is mounted on the frame, and there is a resilient device that holds each friction element in engagement with the vertical damper element to generate a predetermined vertical frictional restraining force acting on the vertical damper element. The vertical restraining force is substantially less than the vertical component of the maximum input force of a seismic event (earthquake). It is generally believed, at the present time, that the maximum input force of an earthquake is about 1.0 "g". Usually, the vertical seismic input is about two-thirds of the horizontal. Accordingly, disregarding the magnifying effect of a vibration isolation system, the maximum force imposed on a mass in an earthquake will be approximately equal to the weight of that mass. The present invention provides, first, for restraining in the vertical direction the vertical damper element with a force that is substantially less than the weight of the supported unit (i.e., supported equipment and any inertia block or base).

A horizontal damper element is coupled to the vertical damper element in a manner that provides both vertical and horizontal lost motion, i.e., vertical and horizontal movements of the horizontal damper element relative to the vertical damper element, corresponding to selected normally expected vibratory movements of the unit, relative to the support, on the isolators. Apart from the lost motion, the horizontal damper element is engageable both vertically and horizontally with the vertical damper element when a relative movement between the horizontal damper element and the vertical damper element exceeds the selected normal movements. A horizontal frame is connected to the other of the unit and the support—that is to say that if the vertical frame for the vertical damper element is attached to the support, then the horizontal frame is connected to the unit. Put even more simply, the seismic restraint assembly can be mounted upside down. The horizontal frame has guide bearings that guide the horizontal damper element for horizontal movement relative to the horizontal frame in any direction. At least one horizontal friction element carried by the second frame is held by a resilient device in engagement with the horizontal damper element to generate predetermined horizontal frictional restraining forces acting between the horizontal frame and the horizontal damper element that are substantially less than the maximum input force of a seismic event, i.e., substantially less than about 1.0 "g" times the mass of the supported unit. The restraint assembly further includes, finally, vertical and horizontal stops for limiting the total displacement of the unit in all directions relative to the support.

The lost motion between the horizontal and vertical damper elements allows for normal vibration of the unit on the supporting isolation system or, in the case of negative isolation, normal vibration of the support relative to the isolated unit. The seismic restraint assembly does not, therefore, affect the normal function of the isolators by which the unit is mounted on the support. In the event of an earthquake that generates an input force having a vertical component that is less than the vertical frictional restraining forces acting between the vertical friction element and the vertical damper element, the input forces will be transmitted directly and undiminished from the support to the unit through the restraint assembly. Similarly, the horizontal component of the input force will be transmitted directly and undiminished to the unit due to the frictional restraint of the second frame by the horizontal damper element. The vertical and horizontal components of seismic forces that exceed the respective frictional restraining forces cause the friction elements to slip. The respective damper elements will, therefore, move relative to the frames, but the energy of the input force is absorbed by the work done as the damper elements slide against the restraining friction elements. Provision is made for substantial total displacement of the damper elements relative to the frames. Only after substantial total displacement (the sum of small displacements that occur during some cycles of the earthquakes) are the vertical and horizontal stops brought into play to stop further displacement. It is expected that the normal operation of the seismic restraint assembly will be such that the stops never function.

In a preferred embodiment of the system, there is a pair of vertical friction elements which engage oppositely located surfaces of the vertical damper element, and the resilient device connects the friction elements and pulls them toward each other into engagement with the vertical damper element. Preferably the resilient device consists of a multiplicity of tie rods, each of which includes a spring, such as a stack of disc or Belleville (dish-shaped) springs, compressed between an abutment on the tie rod and the outer face of one of the friction elements. Threaded tie rods received in fixed nuts on the other friction element permit the spring force, and therefore the frictional force, to be adjusted.

In a preferred embodiment, the horizontal damper element is a flat plate and the horizontal frame comprises a pair of interconnected members located on opposite sides of the damper plate. The horizontal guide bearings comprise a multiplicity of spaced-apart pads of low-friction material on each plate member. Each of the frame members carries a multiplicity of friction elements which are urged by springs toward the damper plate. The damper plate is, therefore, sandwiched between the spring loaded friction elements. Advantageously, the spring force of the springs that urge the frictional elements into engagement with the damper plate can be adjusted by installing shim washers adjacent the spring.

The stops that limit the vertical and horizontal total displacement of the supported unit may be either independent of the restraint assembly, for example, resilient pads located on the device or the support and positioned to stop total displacement of the equipment or resilient elements associated with the damper elements and frames of the assembly. In a preferred embodiment, the vertical resilient limit stops comprise an abutment on the vertical damper element and abutments associated with the vertical frame that are engageable in the limit positions of relative motion of the vertical damper element and frame, resilient pads being provided to cushion and absorb the energy of the deceleration when further vertical displacement is stopped. The horizontal stops may comprise a cylindrical portion of the vertical damper element that is normally centrally located within a hole in the lower plate of the horizontal frame. The vertical damper element receives a cylindrical resilient pad that engages a portion of the hole in the frame plate and cushions and absorbs the energy of deceleration when further horizontal displacement is stopped.

For a better understanding of the invention, reference may be made to the following description of exemplary embodiments, taken in conjunction with the figures of the accompanying drawings.

DESCRIPTION OF EXEMPLARY EMBODIMENTS

Figure 1:
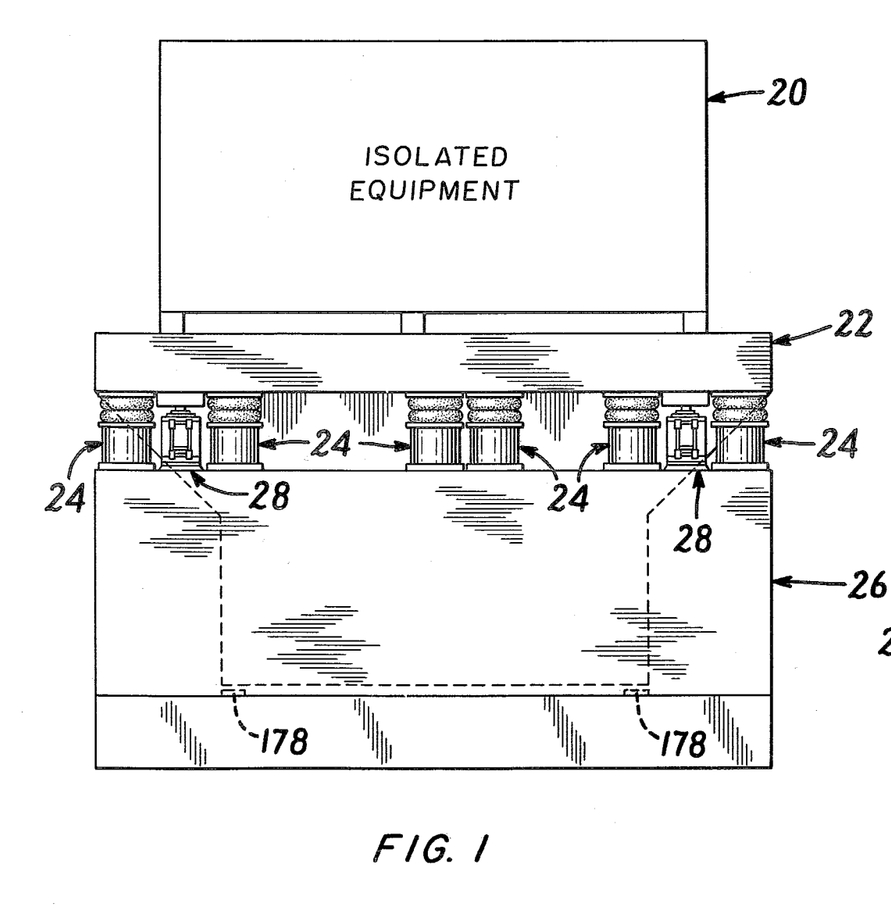
FIG. 1 is a side elevational view of a vibration isolation system comprising isolated equipment mounted on an inertia block which, in turn, is supported on isolators and employs seismic restraint assemblies according to the present invention.
Figure 2:
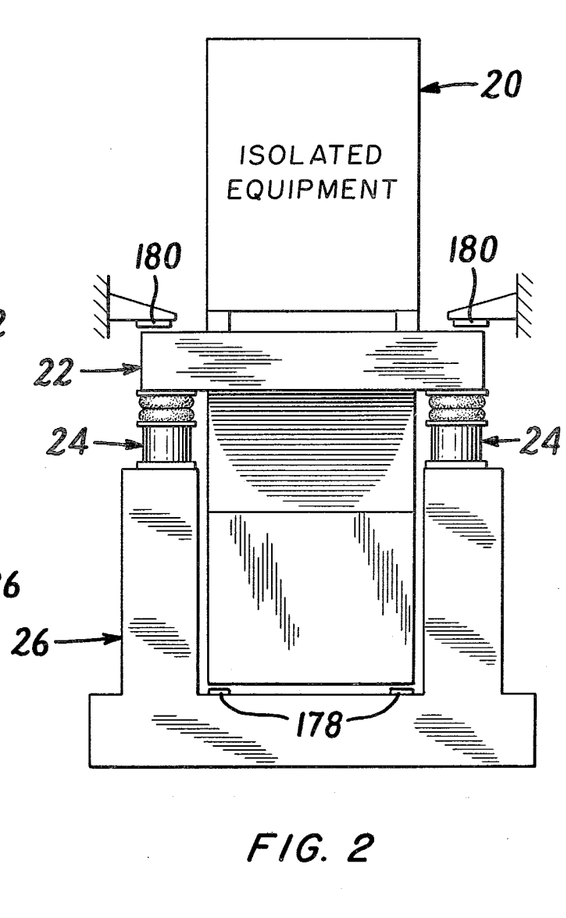
FIG. 2 is an end elevational view of the system shown in FIG. 1.
Figure 3:
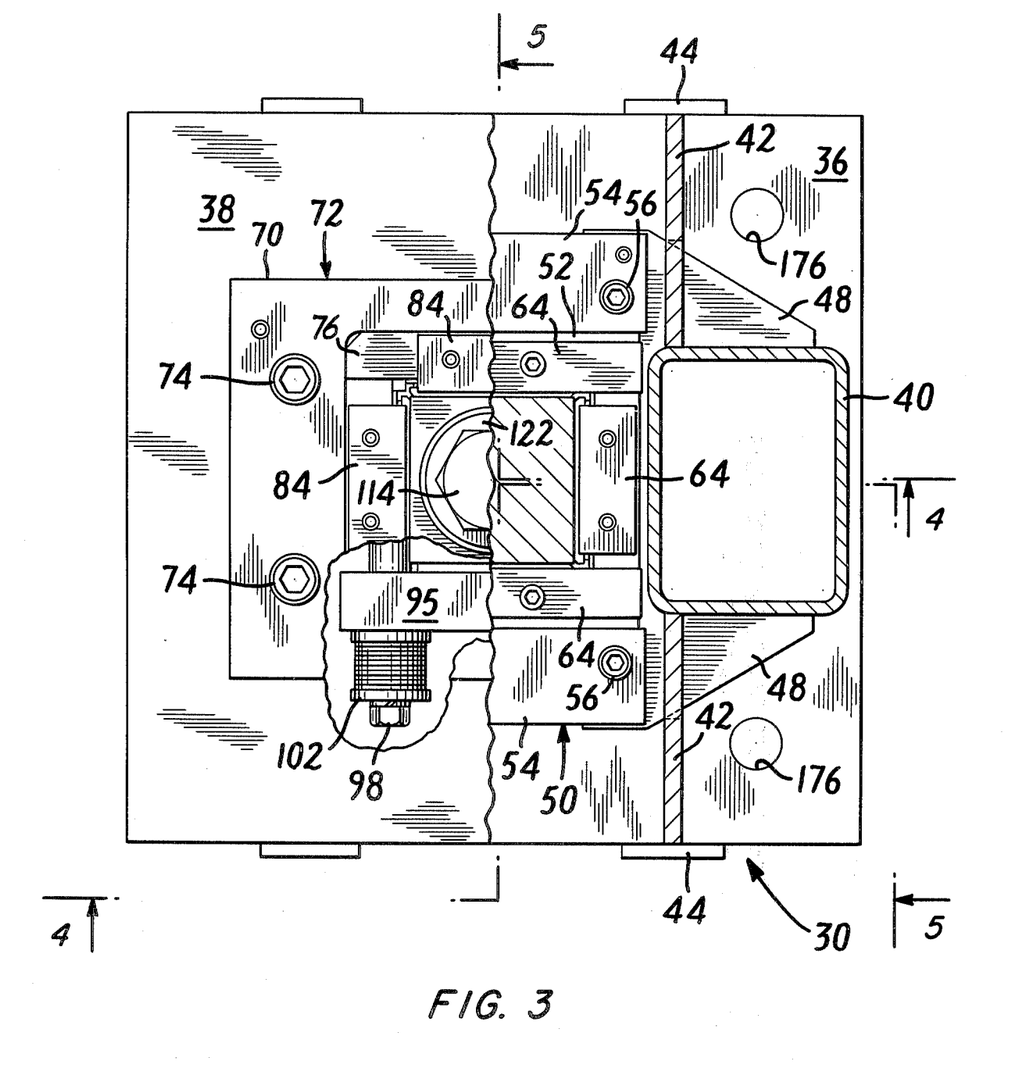
FIG. 3 is a plan view of the vertical damper subassembly of one embodiment of the seismic restraint assembly, a portion being broken away in cross section as represented by the lines 3—3 in FIG. 4.
Figure 4:
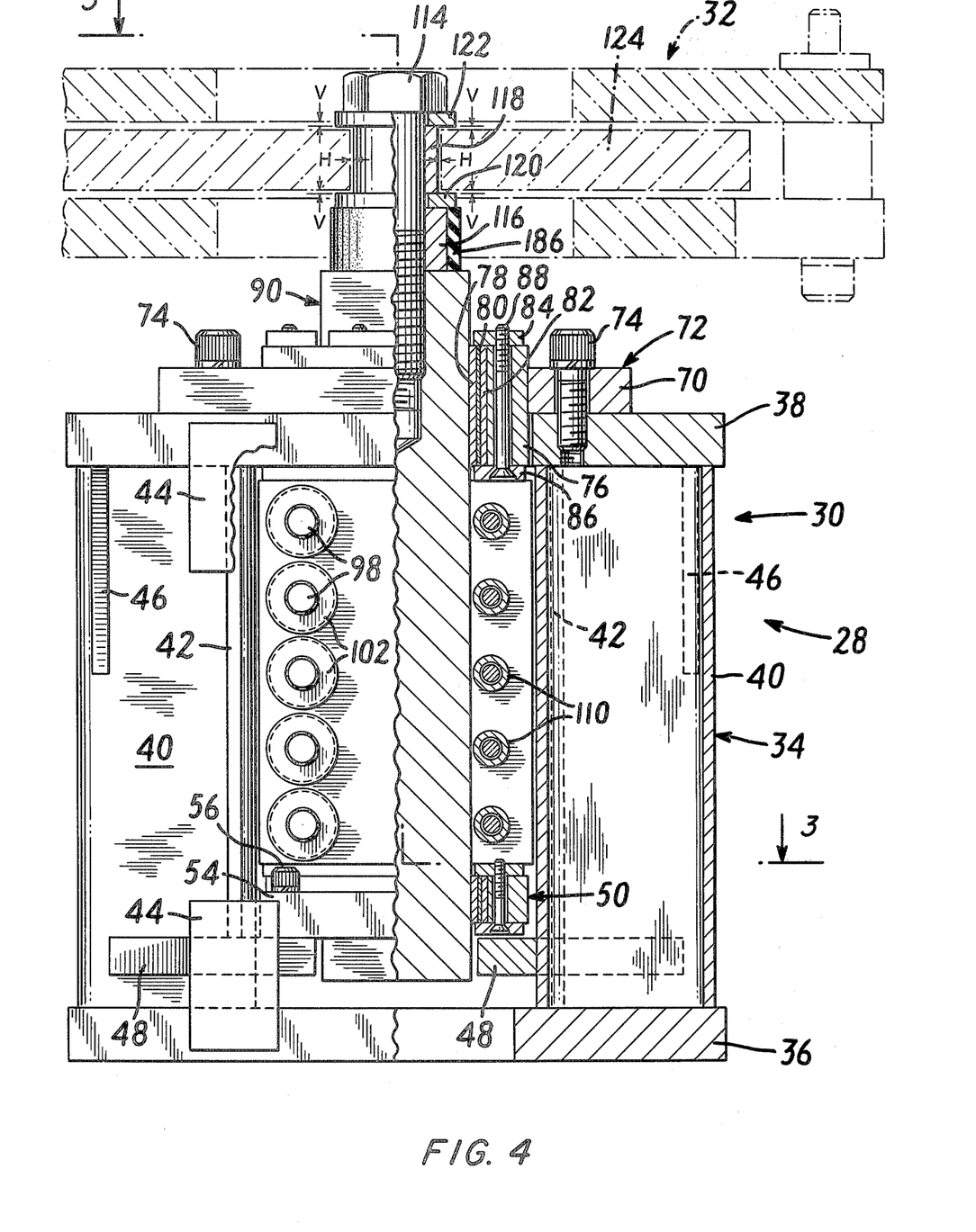
FIG. 4 is a front elevational view of the vertical damper subassembly shown in FIG. 3, a portion being broken away in cross section as indicated generally by the lines 4—4 in FIG. 3.
Figure 5:
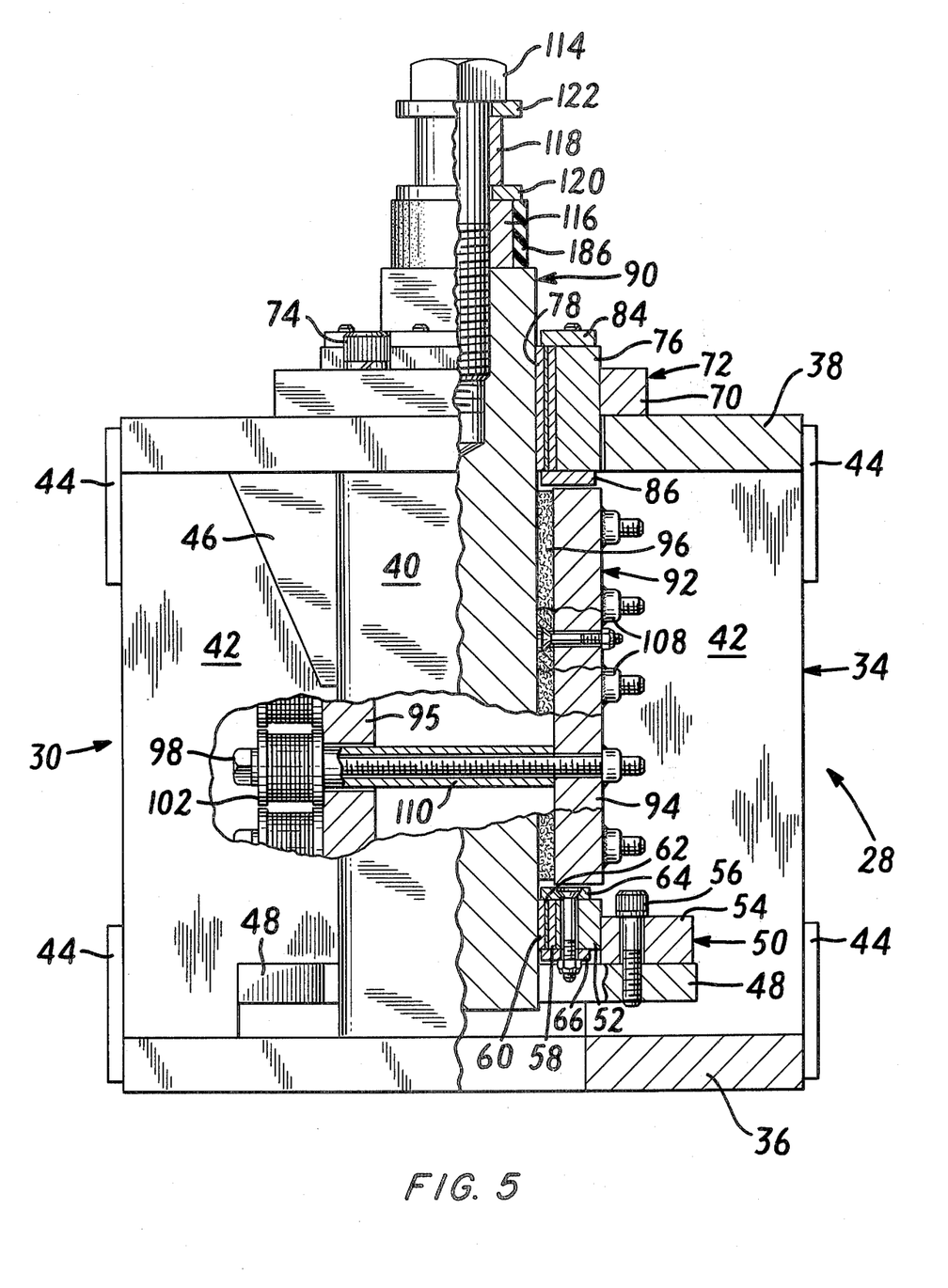
FIG. 5 is a side elevational view of the vertical damper subassembly of FIGS. 3 and 4, a portion broken away in cross section as indicated generally by the lines 5—5 in FIG. 3 and another portion broken out.

In a typical installation of a vibration-isolated unit, as shown in FIGS. 1 and 2, the equipment 20, which is shown schematically and which is typically some sort of machine which produces vibration or may be scientific or other equipment which is to be isolated from ambient vibration, is supported on an inertia block 22. Depending on the problem involved and the design of the system, the inertia block 22 or some sort of base may or may not be used. As a matter of convenience and to reflect the fact that isolators are used in systems with and without inertia blocks, the term "unit" is used herein as a general designation of a mass that is supported on vibration isolators. In particular, in the arrangement shown in FIGS. 1 and 2, the unit, i.e., the isolated equipment 20 and the inertia block 22 in this example, are supported by a multiplicity of vibration isolators 24 which, in turn, are supported on a foundation 26 which represents any suitable support for the unit.

In the example shown in FIG. 1 the isolators 24 are the pneumatic type and have the characteristic of a very low natural frequency, say 1–2 cycles per second. Depending upon the isolation problem involved, various types of isolators having various natural frequencies are selected, and the present invention is useful throughout a wide range of isolation systems. Ordinarily, the isolators 24 support the unit, and in the example selected, negative isolation, the unit is isolated from ambient vibration. For example, electron microscopes are highly sensitive to ambient vibration, and it is highly desirable, if not essential, to mount them on isolators. For costly or essential equipment which is subject to damage of failure in the event of an earthquake, it will often be advisable to provide for protection of the equipment in the event of an earthquake. In many cases, it is sufficient to provide resilient limit stops to prevent the equipment from oscillation excessively. However, these limit stops always magnify the input force of the earthquake minimum by three times and often greater than up to eight and more depending on the input frequency, clearance or gap at stops, and their stiffness. In accordance with the present invention, however, seismic restraint is provided by seismic restraint assemblies 28. One such assembly is mounted near each corner of the inertia block 22 and, as described in more detail, is secured to the foundation 26 and the inertia block 22.

The exemplary embodiment of the seismic restraint assembly that is shown in FIGS. 3 to 10 comprises a vertical restraint subassembly 30 (FIGS. 3 to 6) and a horizontal restraint subassembly 32 (FIGS. 7 to 10). The vertical restraint subassembly 30 comprises a vertical frame 34 that includes a lower plate 36, an upper plate 38 and a pair of vertical tubular columns 40 joining the upper and lower plates. The components of the frame are welded together, and the frame further comprises two sets of vertical plates 42 welded along the columns 40 and to the upper and lower plates, and splice plates 44 joining the upper and lower outer edges of the plates 42 to the top and bottom plates 38 and 36. Stiffener gussets 46 are installed between the columns 40 and the top plate 38, and a lower bearing support plate 48 is welded to each of the columns 40.

The bearing support plates 48 receive a lower bearing assembly 50 that comprises a square outer frame 52 that is welded to a pair of mounting bars 54, one on each side, which span the space between the support plates 48 and are fastened to the support plates by cap screws 56. Within each leg of the square frame 52 is a backup bar 58 that has a cylindrical or beveled surface against the bearing frame so that the bearing plates can rock to accommodate bending deformation of a vertical damper rod 90 and tilting of the rod because of operating clearances in its guide bearings. (The rocking and bending should be taken into account in other parts of the assembly.) The guide bearings for the rod 90 include a bronze bearing pad 60 received inwardly of the backup plate 58 and one or more shims 62 between the backup plate and bearing pad is used to set the bearing fit for each of the bearing pads 60. The backup plate 58, shim or shims 62 and bearing pads 60 are retained on the frame 52 by upper and lower retainer plates 64 and 66 that are bolted to the frame.

A mounting plate 70 of an upper bearing assembly 72 is fastened to the upper plate 38 of the vertical damper subassembly frame by cap screws 74. A frame 76 of the bearing assembly is welded to the mounting plate 70, and each face of the vertical damper rod is engaged by a bronze bearing pad 78 that is backed up by one or more shims 80 and a backup plate 82. Upper and lower retainer plates 84 and 86 fastened together by screws 88 retain the bearing pad, shims and backup plates at each face of the damper rod in place.

The major portion of the vertical damper rod 90 is square in cross section, and the rod 90 is slidably supported adjacent the ends for vertical movement by the upper and lower bearing assemblies. Normally, the vertical damper rod 90 is restrained against vertical movement by a friction assembly that includes a pair of friction elements 92 and 93, each of which includes a brake shoe 94 and 95 and a friction pad 96 and 97 bolted to the respective brake shoe 94 or 95. The two brake shoes 94 and 95 are retained in position vertically between the upper and lower bearing assemblies, but are free to shift transverse to the rod for adjustment, and are resiliently pulled into frictional engagement with opposite faces of the damper rod by spring-loaded tie rods or bolts 98. A vertical row of tie bolt assemblies is located on either side of the damper rod 90 (see FIGS. 4 and 6). Each tie bolt 98 receives a lock washer 100, a spring backup washer 102, a series of Belleville springs 104 and a second spring retainer washer 106 between the bolt head and one of the brake shoes 95. The shank of the bolt extends across the space between the friction elements, passes through the other brake shoe 94, and is threaded into a nut 108 that is welded to the brake shoe 94. The amount of compression of the springs required to produce the desired vertical friction force between the vertical brake elements and the vertical damper rod is predetermined, and spacer tubes 110 and 112 automatically set the desired compression into the springs when the tie bolts 98 are installed and tightened. The spacer tube 112 may be of any selected length, thereby enabling adjustment of the compression force in the spring to adjust the vertical friction force.

The upper end of the vertical damper rod 90 receives a large bolt 114, and a lower spacer ring 116, an upper spacer ring 118, a lower washer 120 and an upper washer 122 are installed between the upper end of the damper rod 90 and the head of the bolt 114. This upper assembly of rings and washers serves to connect the damper rod 90 to the horizontal damper subassembly 32, which is shown in detail in FIGS. 7 to 10. The horizontal damper subassembly 32 comprises a circular damper plate 124 having a central hole 126 that is received on the spacer ring 118 between the washers 120 and 122. The coupling between the horizontal damper plate 124 and the bolt and spacer coupling assembly at the top of the vertical damper rod 90 provides lost motion which allows both vertical and horizontal movement between the horizontal damper plate and the vertical damper rod. When the restraint assembly is initially assembled and installed in the isolation system, shims or other means are used to adjust small vertical clearances "V" (FIG. 4) between the damper plate 124 and the washers 120 and 122 and annular clearance "H" between the spacer ring 118 and the hole 126, the amounts of such clearances being predetermined to provide for a selected maximum normal vibration of the support 26 relative to the supported unit (the inertia block 22 and the equipment 20).

The horizontal damper plate 124 is sandwiched between a top plate 128 and a bottom plate 130 of a horizontal damper subassembly frame. A spacer block 132 is fastened by screws 134 and tie welding to the underside of the upper frame plate 128 near each corner, and the lower frame plate 130 is fastened to the spacer block 132 by screws 135. Spacer plates 136 are welded to the upper surface of the upper frame plate 128, and screws 138 accessible through cutouts 140 in the bottom frame plate 130 are used to fasten the horizontal damper subassembly frame to the underside of the inertia block 22.

Figure 10:
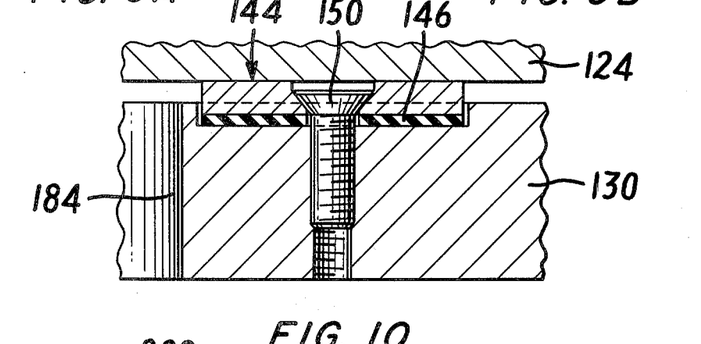
FIG. 10 is a fragmentary cross-sectional view of a horizontal guide bearing as indicated in FIG. 8.

Four bearing pads 142 are installed between the upper frame plate and the damper plate and a corresponding group of four bearing pads 144 are installed between the lower frame plate and the damper plate. As shown in FIG. 10, each bearing pad 142 or 144 (FIG. 10 is representative of both sets of pads 142 and 144) is backed up by a resilient disc 146, to equalize the loads on the bearing pads and to set the sliding fit, and is attached to the frame plate by a screw 150.

Also installed between the respective upper and lower frame plates 128 and 130 and the horizontal damper plate 124 are friction elements which are spring-loaded into engagement with the damper plate to produce a predetermined horizontal friction force acting in all directions for restraining relative movement between the damper plate and the frame.

Figure 9A:
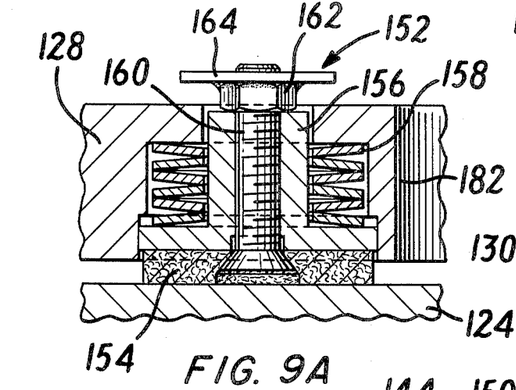
FIG. 9A is a fragmentary cross-sectional detail of an upper friction element and spring, the location of the detail being indicated in FIG. 8.
Figure 9B:
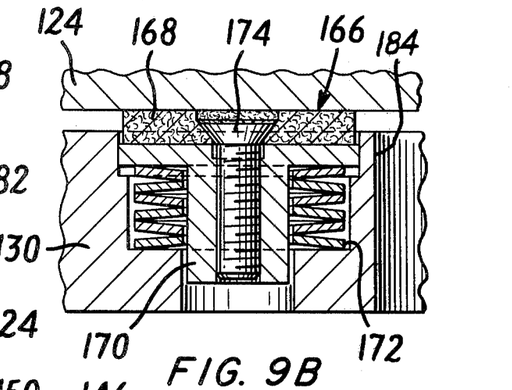
FIG. 9B is a fragmentary cross-sectional detail of a lower friction element, the location of the detail being shown in FIG. 8.

As shown in FIG. 9A, each upper friction element 152 comprises a friction pad 154, and a retainer 156. A stack of Belleville springs 158 urges the pad against the plate 124. A countersunk bolt 160 secures the pad to the retainer. A nut 162 has a plate 164 welded to its upper face, which serves as a keeper to prevent the friction assembly from falling out of the socket in the frame plate between preassembly and final assembly of the device.

The lower frame plate 130 (FIG. 9B) receives a series of lower friction elements 166, each having a friction pad 168, and a retainer 170. A stack of Belleville springs 172 urge the pad against the plate 124 and a countersunk screw 174, secures the pad to the retainer. The upper and lower spring assemblies 152 and 166 can easily be adjusted to provide a desired spring force and, therefore, a desired horizontal frictional restraining force by installing shims in the sockets which receive the assemblies.

The seismic restraint assembly is bolted to the foundation 26 by bolts (not shown) installed through holes 176 in the bottom plate 36 (see FIG. 3) of the frame of the vertical subassembly. As mentioned above, the seismic restraint assembly normally performs no function, and the equipment is supported entirely on the isolators 24 which permit normal relative motion between the support 26 and the supported unit; in particular, any vibration of the support due to ambient vibration is transmitted from the vertical subassembly frame 34 through the vertical friction elements to the vertical damper rod 90, and any relative motion of the horizontal subassembly frame may occur freely both horizontally and vertically because of the clearances H and V (FIG. 4) between the horizontal damper plate and the coupling assembly at the top of the vertical damper rod 90. The horizontal friction assemblies 152 and 166 lock the horizontal damper to the horizontal frame, and the vertical friction assemblies lock the vertical damper rod 90 to the vertical frame 34. The lost motion in the coupling between the vertical and horizontal assemblies allows normal vibration of the support relative to the unit (in the negative isolation example in question).

In the event of an earthquake, the vertical component of the input force acts from the support 26 on the vertical frame 34. The vertical friction assembly is spring-loaded to produce a frictional force substantially less than the input force. The input force can be expressed as a "g" force and, as mentioned above, is considered to be approximately 1.0 "g" maximum. Assume, for example, that it is desired to transmit only one-half of the maximum input force from the support to the supported unit in the vertical direction. The vertical friction assembly will, in this example, be spring-loaded to produce a vertical frictional restraining force equal to one-half of the weight of the supported unit.

If the maximum vertical input acceleration of the support 26 due to the earthquake is less than about 0.5 "g", the vertical friction subassembly will transmit the vertical component to the vertical damper rod 90 which, in turn, will transfer it to the horizontal damper assembly 32 through the coupling at the upper end of the rod. Hence a vertical input force of less than the selected magnitude will be transmitted directly to the supported unit by the seismic restraint assembly.

If the vertical component of an input acceleration of seismic origin exceeds the selected maximum that is to be transferred by the restraint assembly to the supported unit (in this example, more than about 0.5 "g")

the frictional force loaded into the vertical friction elements 92 will be exceeded, and the vertical damper rod will be allowed to slip and move relative to the vertical frame 34. The vertical force transmitted by the restraint assembly to the supported unit will be equal to the frictional force, and the excess of the input force over the frictional force will produce relative motion of the damper rod and vertical frame.

The energy generated by the excess of the input force over the frictional force is dissipated by the work done as the damper rod moves relative to the vertical frame in opposition to the vertical frictional force, and the damper rod will stop after only a small amount of movement after each cycle of the earthquake. Over the entire series of cycles of input acceleration due to the earthquake, the unit may have displaced a substantial total distance, however, so provision is made for such movement in the design of the restraint assembly.

The embodiment of the seismic restraint assembly shown in FIGS. 3 to 11 does not include vertical stops. Instead, as shown in FIG. 2, resilient stop pads 178 are installed on the bottom of the support 26, (see FIGS. 1 and 2) below the inertia block 22 to stop total downward displacement of the supported unit, and upper resilient stop pads 180 are installed on structures adjacent the unit to stop upward motion. Based on the MIT research referred to above, the restraint assembly should be designed for displacement of the unit up to the total expected amount, and the stops should be located where they do not function unless the expected displacement is exceeded.

The horizontal restraint subassembly 32 works in essentially the same way as the vertical restraint subassembly. The horizontal component in any direction of a seismic input force is transmitted by the vertical frame 34 to the vertical damper rod 90 by the bearing assemblies 50 and 72, and the damper rod transmits the horizontal component of the input force to the horizontal damper plate 124 through the coupling assembly. The upper and lower horizontal friction elements 152 and 166 transmit up to the selected maximum horizontal component to the horizontal frame, and, therefore, to the supported unit. The horizontal component of a seismic input force greater than the selected maximum to be transmitted produces slippage of the horizontal damper plate 124 relative to the frame. The upper and lower frame plates 128 and 130 have relatively large circular holes 182 and 184, respectively, so that the horizontal frame can move relative to the horizontal damper plate 124 in any direction within those holes. Should the total displacement exceed the clearance between the coupling assembly and the hole 184 in the lower frame plate 130 (an unlikely event), a resilient stop sleeve 186 glued to the spacer 116 engages the wall of the hole 184 and stops further displacement of the horizontal frame relative to the damper plate 124.

Figure 11:
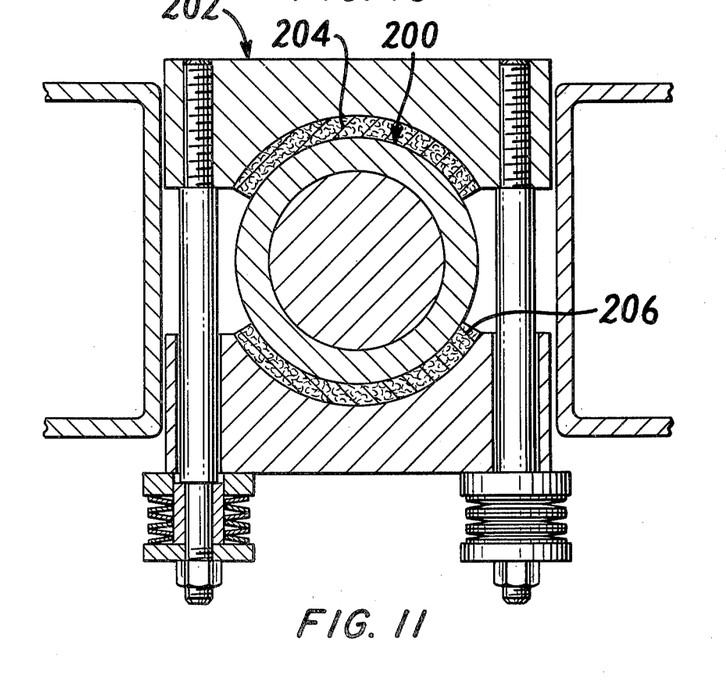
FIG. 11 is a plan cross-sectional view of a portion of an alternative design for the vertical damper subassembly.

It will be readily apparent to those skilled in the art that numerous variations and modifications may be made in the particular design of the vertical and horizontal restraint subassemblies, the arrangement of bearings, friction elements and, certainly, the frame system of the restraint assembly. An example of such a modification is shown in FIG. 11, namely the substitution of a vertical damper element 200 of circular cross section for the square cross section element of the embodiment of FIGS. 3 to 10. The vertical friction subassembly 202 includes arcuate friction elements 204 and 206. The vertical friction assembly can also, of course, be a plate or of any other form that enables frictionally restrained vertical sliding motion.

Figure 6:
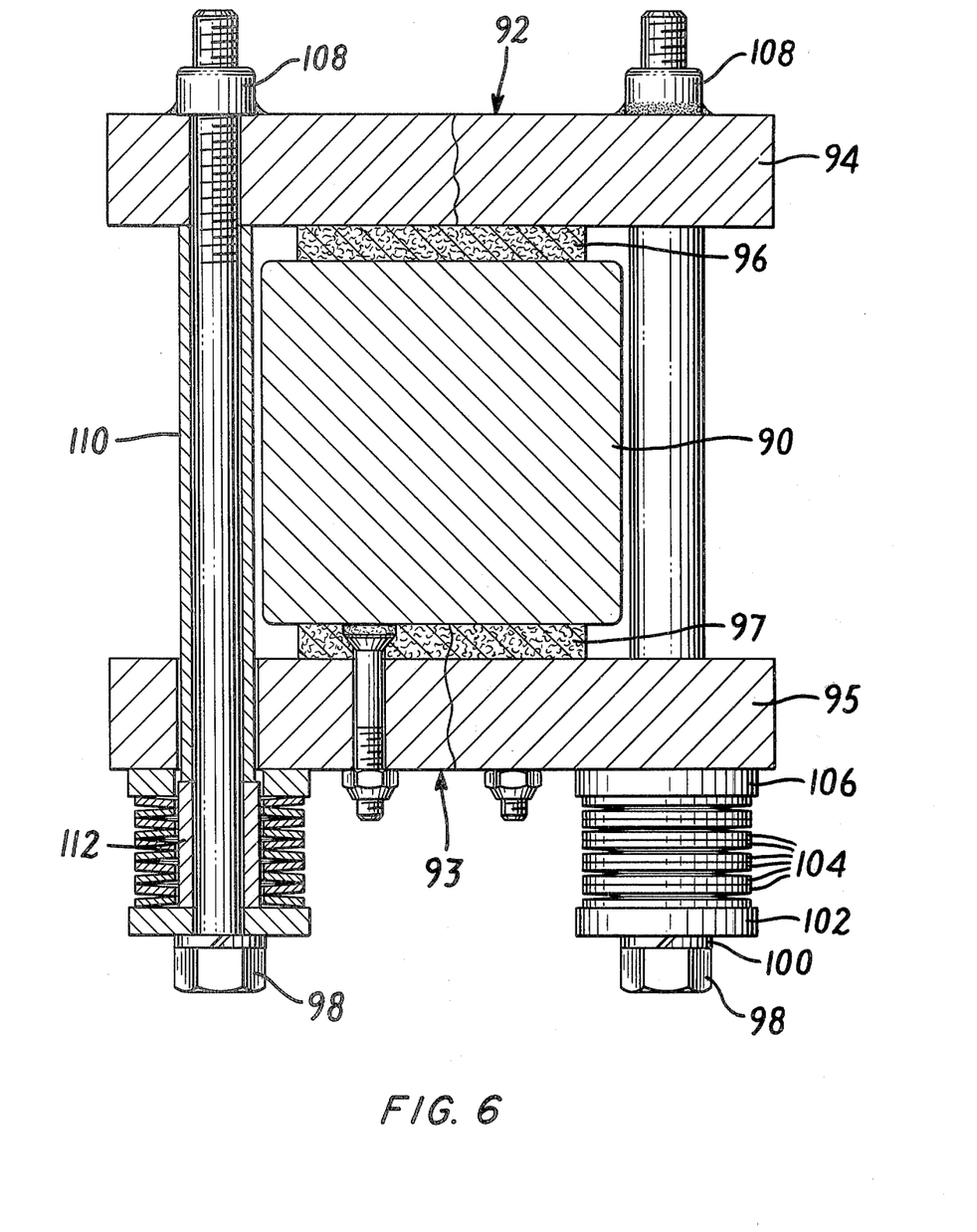
FIG. 6 is a top cross-sectional view of the vertical friction elements and vertical damper rod of the vertical damper subassembly shown in FIGS. 3 to 5.
Figure 7:
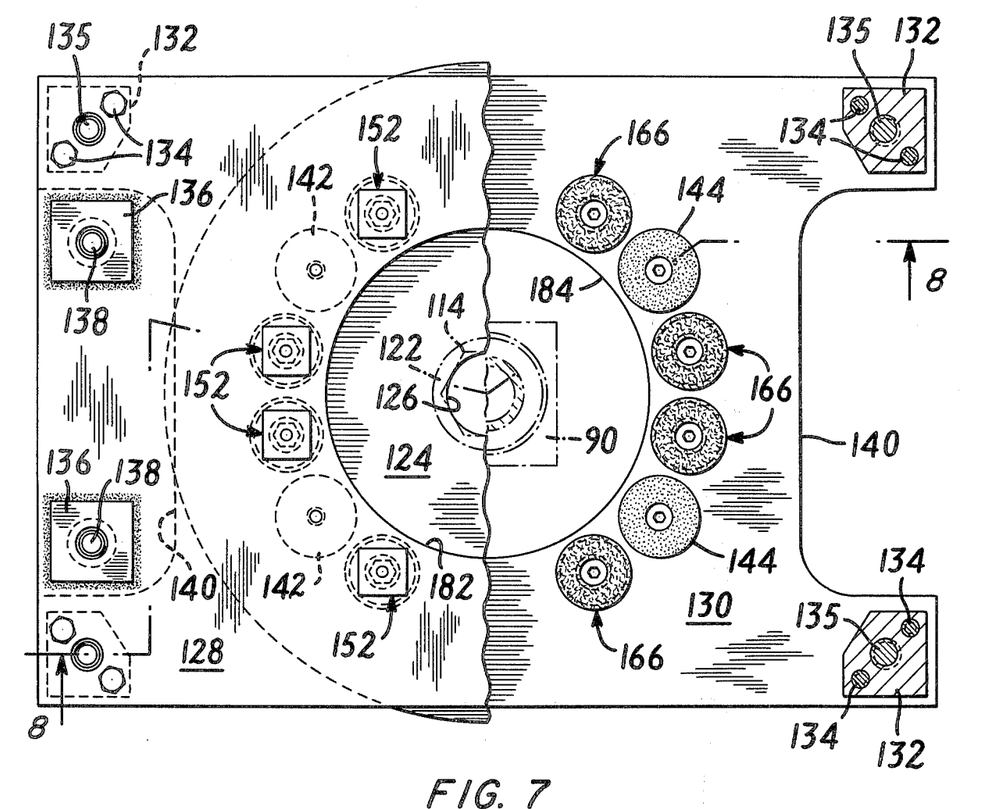
FIG. 7 is a plan view of the horizontal damper subassembly of the restraint assembly shown in phantom lines in FIG. 4, a portion being broken away in cross section as indicated generally by the lines 7—7 in FIG. 8.
Figure 8:
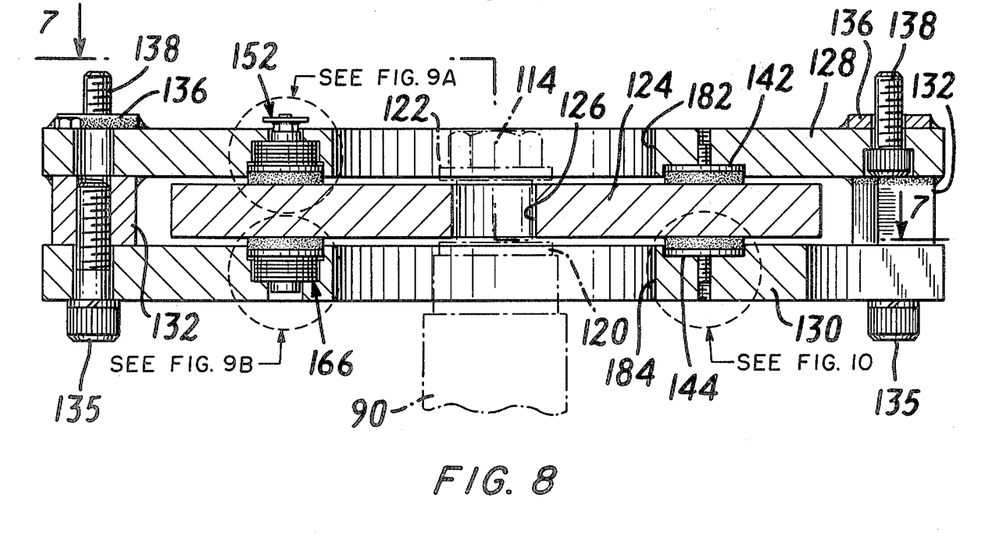
FIG. 8 is a broken, front cross-sectional view of the horizontal damper subassembly shown in FIG. 7, the section being represented by the lines 8—8 of FIG. 7.
Figure 12:
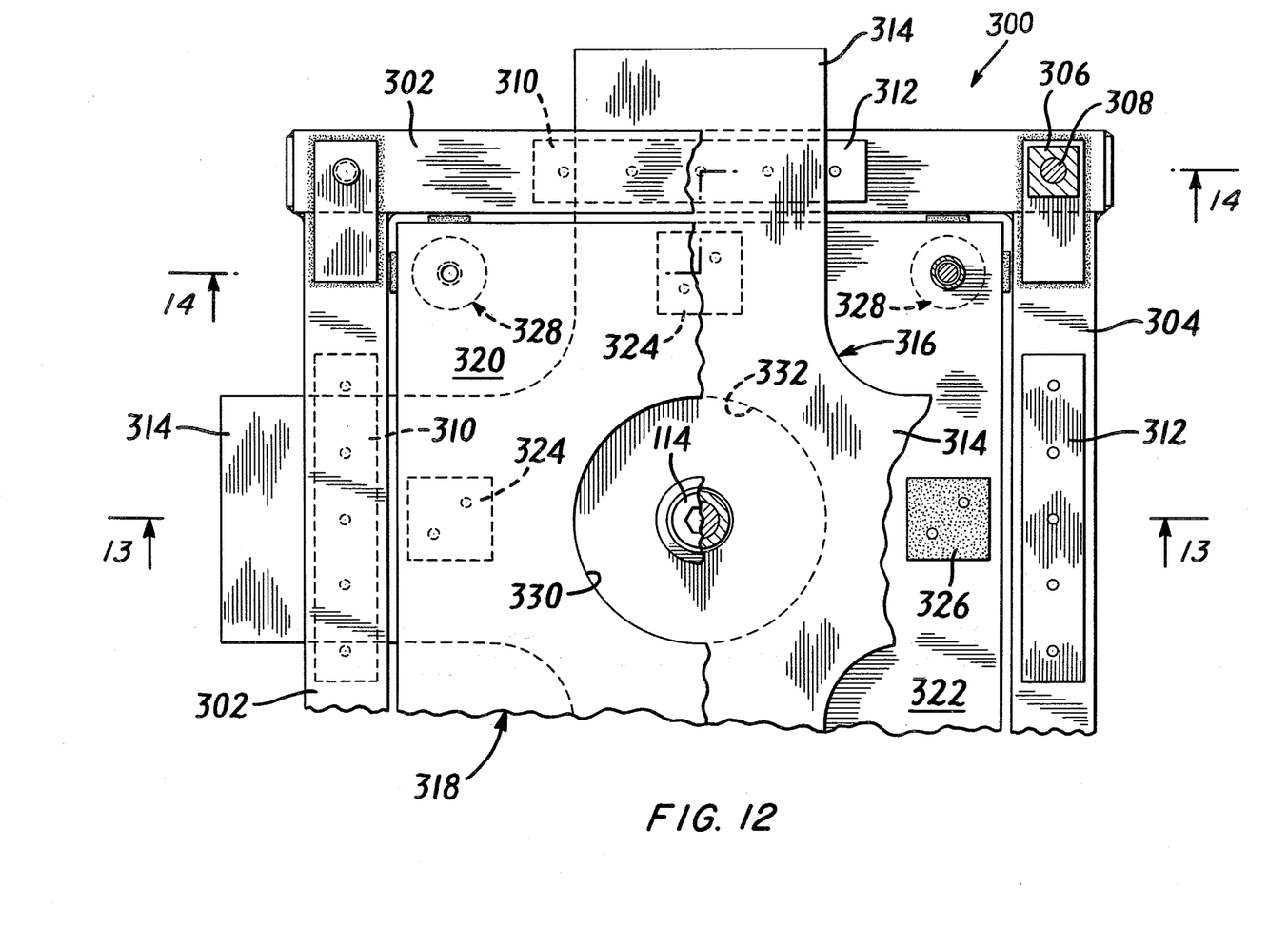
FIG. 12 is a plan, half cross-sectional view of an alternative design for the horizontal damper subassembly, taken along the lines 12—12 of FIG. 13 with a portion of the horizontal damper plate broken away.
Figure 13:
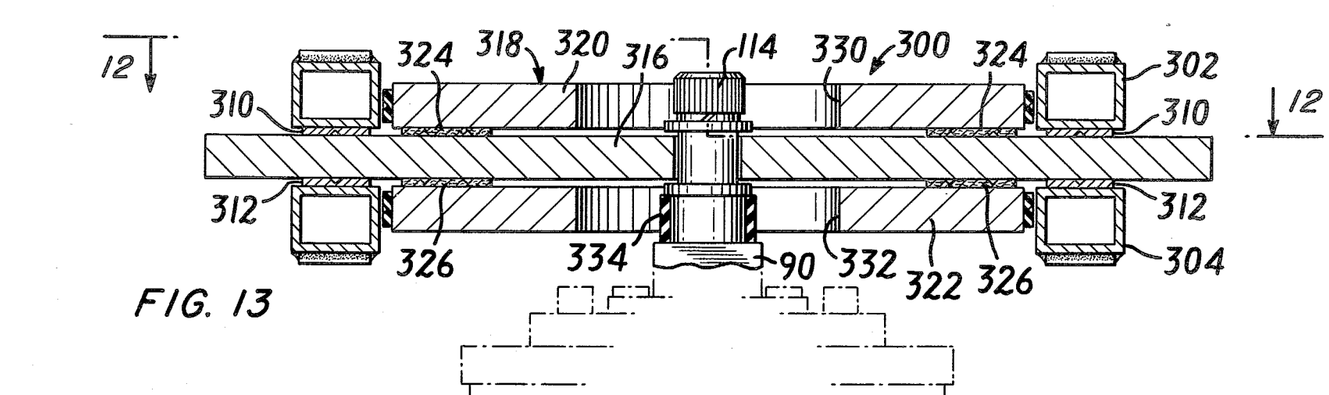
FIG. 13 is a cross-sectional view of the horizontal damper subassembly shown in FIG. 12, taken generally along the lines 13—13 of FIG. 12.
Figures 14, 15:
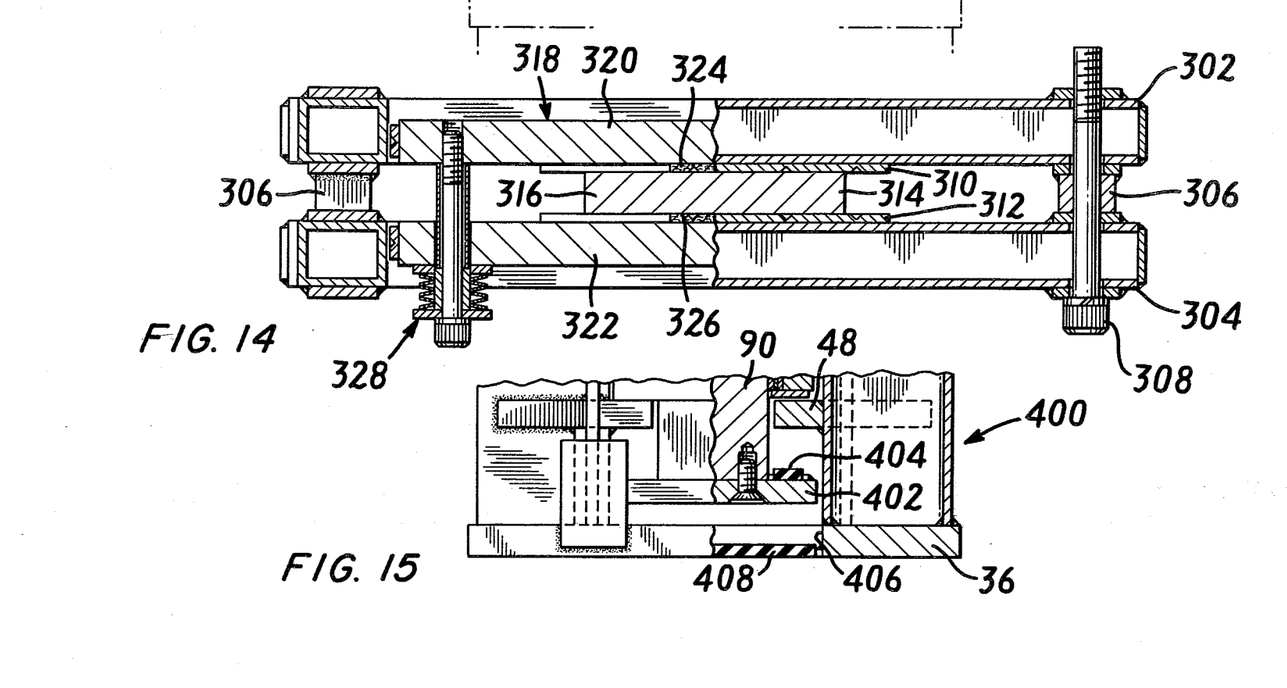
FIG. 14 is a cross-sectional view of the subassembly shown in FIGS. 12 and 13 taken generally along the lines 14—14 of FIG. 12.
FIG. 15 is a front, half cross-sectional view of the lower portion of a modified vertical damper subassembly in which vertical stops have been incorporated.

FIGS. 12 to 14 show a modified horizontal restraint subassembly 300 that can be substituted for the subassembly 32 shown in FIGS. 7 to 10. The subassembly 300 comprises upper and lower peripheral frames 302 and 304 that are welded up from tubular members, separated by spacer blocks 306 and fastened to each other and to the supported unit by screws 308. Upper and lower bearing pads 310 and 312 are installed on each leg of each frame 302 and 304 opposite each other for sliding engagement with arms 314 of a cross-shaped horizontal damper plate 316. The damper plate 316 is frictionally engaged by a friction assembly 318 that is composed of upper and lower brake plates 320 and 322, upper and lower friction pads 324 and 326 fastened to the plates in positions for frictional engagement with the respective four arms 314 of the damper plate 316, and spring assemblies 328 of substantially the same type as shown in FIG. 6 to urge the brake plates toward each other and provide a predetermined horizontal frictional force between the brake shoes and the damper plate. The brake plates have circular holes 330 and 332 that leave a substantial clearance for movement of the frame and brake plates relative to the damper plate, but such movement is limited by engagement of a resilient stop sleeve 334 with the wall of the hole 332. Clearances are left between the damper plate 316 and the coupling assembly at the top of the vertical damper rod 90 to allow normal vibratory motion of the support relative to the supported device. The operation of the embodiment shown in FIGS. 12 to 14 is the same as the operation of the embodiment shown in FIGS. 7 to 10, and further description is unnecessary.

FIG. 15 illustrates an alternative way of stopping vertical motion of the vertical damper rod relative to the vertical frame. The vertical restraint subassembly 400 shown in FIG. 15 is the same as the one shown in FIGS. 3 to 6 except that it has a stop abutment in the form of a plate 402 fastened to the bottom of the vertical damper rod 90. An annular resilient upper stop pad 404 is installed on the top of the abutment 402 and stops upward motion of the damper rod 90 relative to the vertical frame by engaging the lower bearing mounting plate 48 (see also FIG. 4). The lower frame plate 36 has a central hole 406 somewhat larger than the stop plate 402, and a resilient lower stop pad 408 is glued to the support and stops the total downward displacement of the damper rod 90. Obviously, the lower stop pad 408 could be installed on a lower frame plate that does not have a central hole.

The foregoing embodiments, variations and modifications are merely exemplary of those which will readily occur to those skilled in the art without departing from the spirit and scope of the present invention. All such variations and modifications are intended to be within the scope of the invention as defined in the appended claims.

I claim:

1. A vibration isolation system for mounting a unit on a support including a plurality of vibration isolators interposed between the unit and the support and at least one seismic restraint assembly interposed between the unit and the support characterized in that the seismic restraint assembly includes a vertical frame attached to one of the unit and the support, vertical guide bearings on the vertical frame, a vertical damper element received to move vertically in the vertical guide bearings, at least one vertical friction element carried by the vertical frame, at least one resilient device holding the friction element in engagement with the vertical damper element to generate a predetermined vertical frictional restraining force acting therebetween that is substantially less than the maximum vertical input force of a seismic event, a horizontal damper element coupled to the vertical damper element for vertical and horizontal movements relative thereto corresponding to selected normally expected movements of the unit, relative to the support, on the isolators but engageable with the vertical damper element upon greater than the selected movements, a horizontal frame connected to the other of the unit and the support, horizontal guide bearings on the horizontal frame guiding the horizontal damper element for horizontal movement relative thereto at least one horizontal friction element carried by the horizontal frame, at least one other resilient device holding the horizontal friction element in engagement with the horizontal damper element to generate predetermined horizontal frictional restraining forces acting therebetween that are substantially less than the maximum horizontal input force of a seismic event, and vertical and horizontal stops for limiting the total relative displacement of the unit, resulting from a seismic event, whereby the friction elements limit the vertical and horizontal forces transmitted from the support to the unit to values substantially less than the maximum input forces.

2. A vibration isolation system according to claim 1 and further characterized in that the vertical damper element is a damper rod, there is at least one vertical friction element engaging each of a pair of oppositely located surfaces of the damper rod, and the first mentioned resilient device is fastened between the vertical friction elements and pulls them toward each other into frictional engagement with the damper rod.

3. A vibration isolation system according to claim 2 and further characterized in that each first mentioned resilient device includes a tie rod connected to a vertical friction element on one side of the damper rod and passing through a vertical friction element on the other side of the damper rod and a spring engaged between the back of the latter friction element and an abutment on the tie rod spaced-apart from the back of the latter friction element.

4. A vibration isolation system according to claim 1 and further characterized in that there are vertically spaced-apart upper and lower vertical guide bearings, each of which comprises means fastened to the frame for locating bearing pads of low friction material within said means for locating.

5. A vibration isolation system according to claim 1 and further characterized in that the horizontal damper element is a flat plate, the horizontal frame comprises a pair of interconnected members disposed on opposite sides of the plate, the horizontal guide bearing comprises a plurality of spaced-apart pads of anti-friction material and in that there is a multiplicity of friction elements supported on each frame members in engagement with the damper plate and urged by springs toward the damper plate.

6. A vibration isolation system according to claim 1 and further characterized in that the stops for limiting horizontal displacement are constituted by inwardly facing surfaces on a horizontal frame member and at least one surface on the vertical damper element that are engageable therewith and at least one resilient pad on one of said surfaces.

7. A vibration isolation system according to claim 1 and further characterized in that the horizontal frame includes a peripheral member defining vertically spaced-apart surfaces carrying oppositely located horizontal guide bearings in the form of pads of low-friction material, the horizontal damper element includes arms slidably supported by the pads, and there is at least one said horizontal friction element engaging each of at least one pair of oppositely located flat parallel surfaces of the horizontal damper element, and the one resilient device is fastened between the horizontal friction elements on opposite sides of the horizontal damper element and pulls them toward each other into frictional engagement with the horizontal damper element.

8. A vibration isolation system according to claim 7 and further characterized in that each resilient device includes a tie rod connected to the friction element on one side of the horizontal damper element and passing through the friction element on the other side of the damper element and a spring engaged between the back of the latter friction element and an abutment on the tie rod spaced apart from the back of the latter friction element.

9. A vibration isolation system according to claim 1 and further characterized in that the stops for limiting vertical displacement comprise at least one abutment on the vertical damper element, co-acting abutments on one of said frames vertically spaced apart from the abutments on the damper rod, and resilient pads interposed between said abutments.

10. A vibration isolation system according to claim 2 and further characterized in that the vertical friction elements are restrained by the vertical frame against vertical movement but are movable relative to the vertical frame in the direction of the spring force of the vertical resilient device to enable adjustment of the friction force.

11. A vibration isolation system according to claim 7 and further characterized in that the horizontal friction elements are restrained by the peripheral frame member against substantial horizontal movement in any direction but are movable vertically with respect to the frame to enable adjustment of the friction force.

* * * * *